United States Patent
Norita et al.

(10) Patent No.: US 10,790,480 B2
(45) Date of Patent: Sep. 29, 2020

(54) LITHIUM-ION SECONDARY-BATTERY CASE AND MANUFACTURING METHOD THEREFOR

(71) Applicant: Nisshin Steel Co., Ltd., Tokyo (JP)

(72) Inventors: Katsunari Norita, Sakai (JP); Norimasa Miura, Sakai (JP); Jun Kurobe, Tokyo (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 196 days.

(21) Appl. No.: 15/506,157

(22) PCT Filed: Aug. 25, 2014

(86) PCT No.: PCT/JP2014/004368
§ 371 (c)(1),
(2) Date: Feb. 23, 2017

(87) PCT Pub. No.: WO2016/030918
PCT Pub. Date: Mar. 3, 2016

(65) Prior Publication Data
US 2017/0271627 A1    Sep. 21, 2017

(51) Int. Cl.
*H01M 2/02* (2006.01)
*H01M 2/04* (2006.01)
(Continued)

(52) U.S. Cl.
CPC ...... *H01M 2/0265* (2013.01); *B23K 11/0026* (2013.01); *B23K 11/061* (2013.01);
(Continued)

(58) Field of Classification Search
CPC ................................. H01M 2/02–08
See application file for complete search history.

(56) References Cited

U.S. PATENT DOCUMENTS

2011/0250485 A1\* 10/2011 Tsukuda ............ H01M 2/021
429/153

FOREIGN PATENT DOCUMENTS

EP    2709128 A1    3/2014
JP    H08-102313 A    4/1996
(Continued)

OTHER PUBLICATIONS

Machine translation of Miura et al. (JP 2013/041788). Available Feb. 28, 2013.\*
(Continued)

*Primary Examiner* — Jonathan G Leong
*Assistant Examiner* — Jacob Buchanan
(74) *Attorney, Agent, or Firm* — Lucas & Mercanti, LLP

(57) ABSTRACT

A lithium-ion secondary-battery case that allows bonding without weld spatter and has high strength against external force acting on the battery case, and a method for manufacturing the lithium-ion secondary-battery case are provided. Specifically, an austenitic stainless steel foil is used for a cup component (2), and a two-phase stainless steel having an austenite transformation start temperature $A_{C_1}$ in a temperature increase process at 650° C. to 950° C. and an austenite and ferrite two-phase temperature range of 880° C. and higher, is used for a cover component (3), and the diffusion bonding is proceeded while accompanied by grain boundary movement upon transformation of the two-phase steel from a ferrite phase into an austenite phase within a heating temperature range of 880° C. to 1080° C.

2 Claims, 3 Drawing Sheets

(51) Int. Cl.

| | | |
|---|---|---|
| *C22C 38/00* | (2006.01) | |
| *C22C 38/04* | (2006.01) | |
| *C22C 38/02* | (2006.01) | |
| *B23K 11/06* | (2006.01) | |
| *C22C 38/50* | (2006.01) | |
| *B23K 11/00* | (2006.01) | |
| *C22C 38/42* | (2006.01) | |
| *C22C 38/44* | (2006.01) | |
| *B23K 11/20* | (2006.01) | |
| *B23K 20/02* | (2006.01) | |
| *B23K 20/227* | (2006.01) | |
| *C22C 38/06* | (2006.01) | |
| *B23K 20/24* | (2006.01) | |
| *H01M 10/0525* | (2010.01) | |
| *B23K 103/04* | (2006.01) | |
| *B23K 103/18* | (2006.01) | |

(52) U.S. Cl.
CPC ............ *B23K 11/20* (2013.01); *B23K 20/023* (2013.01); *B23K 20/227* (2013.01); *B23K 20/24* (2013.01); *C22C 38/00* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01); *H01M 2/0217* (2013.01); *H01M 2/0252* (2013.01); *H01M 2/0426* (2013.01); *H01M 2/0447* (2013.01); *H01M 2/0473* (2013.01); *H01M 2/0478* (2013.01); *H01M 2/0486* (2013.01); *H01M 10/0525* (2013.01); *B23K 2103/05* (2018.08); *B23K 2103/18* (2018.08); *C21D 2211/001* (2013.01); *Y02T 10/7011* (2013.01)

(56) References Cited

FOREIGN PATENT DOCUMENTS

| JP | 2004052100 A | 2/2004 |
|---|---|---|
| JP | 2006179840 A | 7/2006 |
| JP | 2011-102424 A | 5/2011 |
| JP | 2013041788 A | 2/2013 |
| JP | 2013103271 A | 5/2013 |

OTHER PUBLICATIONS

Machine translation of Sugama et al. (JP 2013-103271). Available May 30, 2013.*
International Search Report dated Oct. 14, 2014 for Application No. PCT/JP2014/004368 and English translation.
European Search Report dated Jul. 25, 2017 from the corresponding European Application No. 14900810.4.

* cited by examiner

LITHIUM-ION SECONDARY-BATTERY CASE AND MANUFACTURING METHOD THEREFOR

CROSS REFERENCE TO RELATED APPLICATION

This Application is a 371 of PCT/JP2014/004368 filed on Aug. 25, 2014, which is incorporated herein by reference.

TECHNICAL FIELD

The present invention relates to a lithium-ion secondary-battery case formed by using a stainless steel foil as a material thereof, and a method for manufacturing the lithium-ion secondary-battery case.

BACKGROUND ART

Lithium-ion secondary batteries have high energy and are thus used for, for example, power sources for mobile communication devices and power sources for portable information terminals. The lithium-ion secondary batteries have begun in recent years to be used for, for example, power sources for driving hybrid cars or electric cars which have widely been used as global warming countermeasures.

As cases for such lithium-ion secondary batteries, those obtained by deep drawing a thin aluminum plate or a thin stainless steel plate as a material into a cylindrical shape or an angular cylindrical shape, have conventionally been used. In this case, the materials each typically have a sheet thickness of 0.5 to 0.8 mm. However, for the purpose of achieving weight saving, lithium-ion secondary batteries have started to be used, which use, as a case material, an aluminum laminating material obtained by using an aluminum foil with a sheet thickness of 0.1 mm or less as a base material and superposing a resin film of polypropylene or the like on a surface of the base material.

Here, one example of a method (processes) of manufacturing a lithium-ion secondary battery will be described. First, an aluminum laminating material is subjected to drawing to form a cup component with a flange, and positive and negative electrodes having a separator sandwiched therebetween are stored into the cup and positive and negative electrode terminals are drawn out from the flange part of the cup component. On the other hand, a cup-shaped or a flat plate-shaped cover component is prepared by using the same material as that of the cup component, and the cup component and the cover component are superposed on each other and then bonded to each other through heat sealing by which a resin film in the aluminum laminate material is pressurized, heated, and melted at the flange part. After completion of the bonding, an electrolytic solution is injected into the case to complete a lithium-ion secondary battery.

Such a battery case using an aluminum laminating material can achieve weight saving. However, since the base material is aluminum, the battery case has low strength against external force, and therefore faces a problem that a reinforcement plate protecting the battery case needs to be separately provided.

The aforementioned battery case also faces a problem that the electrolytic solution leaks from the bonded part obtained through the heat sealing, resulting in deteriorated battery performance.

Thus, in order to resolve the insufficient strength of the current lithium-ion secondary-battery case against external force, Patent Literature 1 suggests a method of using an austenitic stainless foil as a material and using seam welding for bonding of a cup component to a cover component. In the aforementioned method, the austenitic stainless foil having greater strength than an aluminum laminating material is used as the material and the seam welding is adopted for the bonding, which can resolve: the insufficient strength of a battery case, which uses an aluminum laminating material as a material, against external force; and the electrolytic solution leakage from the heat sealed part. However, weld spatter occurs inside and outside of the cup upon the seam welding, resulting in a risk that internal short-circuit of the battery occurs.

CITATION LIST

Patent Literature

[PTL 1] Japanese Laid-Open Patent Publication No. 2004-52100

SUMMARY OF INVENTION

Technical Problem

As described above, the lithium-ion secondary-battery case disclosed in Patent Literature 1 uses the austenitic stainless foil as the material and uses the seam welding for the bonding to thereby resolve the problems of weight saving, the strength against external force, and the electrolytic solution leakage, but cannot complete the bonding without weld spatter upon the seam welding.

Thus, it is an object of the present invention to provide a lithium-ion secondary-battery case that allows bonding without weld spatter and has strength against external force, and a method for manufacturing the lithium-ion secondary-battery case.

Solution to Problem

To address the object described above, a lithium-ion secondary-battery case 1 according to the present invention uses stainless steel foils as materials of a cup component 2 and a cover component 3 and bonding portions of the cup component 2 and the cover component 3 are bonded to each other through diffusion bonding to thereby realize bonding without weld spatter.

That is, a lithium-ion secondary-battery case 1 includes: a cup component 2 which is formed of an austenitic stainless steel foil and which has a flange 8 formed at a peripheral edge thereof; and a cover component 3 which is formed of a two-phase stainless steel foil having an austenite transformation start temperature $A_{C1}$ in a temperature increase process at 650° C. to 950° C. and having an austenite and ferrite two-phase temperature range of 880° C. and higher and which covers the opening part of the cup component 2, wherein a hole 6 for drawing out an electrode terminal is provided at a vertical wall part 7 of the cup component 2, and the flange 8 in the cup component 2 and the cover component 3 are brought into direct contact with each other to integrate the cup component 2 and the cover component 3 through diffusion bonding.

A method for manufacturing a lithium-ion secondary-battery case 1 according to the present invention, upon bringing stainless steel foils into direct contact with each other to integrate the stainless steel foils through diffusion bonding, adopts an austenitic stainless steel foil as a material of the cup component 2 of the stainless steel foil to be made contact since the material involves drawing, and adopts, as a material of the cover component 3, a two-phase stainless steel foil having an austenite transformation start temperature $A_{C1}$ in a temperature increase process at 650° C. to 950° C. and having an austenite and ferrite two-phase temperature range of 880° C. and higher. Then the diffusion bonding is proceeded while accompanied by grain boundary movement upon transformation of the two-phase stainless steel foil from a ferrite phase into an austenite phase within a heating temperature range of 880° C. to 1080° C.

In the invention described above, in particular, as the two-phase stainless steel foil used for the cover component 3, it is preferable to adopt a two-phase stainless steel foil having the following chemical composition, and having an austenite and ferrite two phase temperature range of 880° C. and higher. The two-phase stainless steel foil contains, in % by mass, 0.0001-0.15% of C, 0.001-1.0% of Si, 0.001-1.0% of Mn, 0.05-2.5% of Ni, 13.0-18.5% of Cr, 0-0.2% of Cu, 0-0.5% of Mo, 0-0.05% of Al, 0-0.2% of Ti, 0-0.2% of Nb, 0-0.2% of V, 0-0.01% of B, 0.005-0.1% of N, and a remainder containing Fe and inevitable impurities, and an X value expressed by the following formula (1) ranges from 650 to 950.

$$X \text{ value}=35(Cr+1.72Mo+2.09Si+4.86Nb+8.29V+ 1.77Ti+21.4Al+40.0B-7.14C-8.0N-3.28Ni- 1.89Mn-0.51Cu)+310 \quad (1)$$

The above X value is an index that permits accurate estimation of the austenite transformation start temperature point $A_{C1}$ in the temperature increase process in the two-phase system stainless steel foil having the austenite and ferrite two-phase temperature range of 880° C. and higher.

Stainless steels are typically classified, based on metallic structures thereof at room temperature, into: an austenitic stainless steel, a ferritic stainless steel, a martensitic stainless steel, etc. The "two-phase stainless steel" stated in the present specification refers to a steel that becomes an austenite and ferrite two-phase structure in a temperature range of the point $A_{C1}$ and higher. Such two-phase stainless steels include the ferritic stainless steel and the martensitic stainless steel.

Moreover, in the invention described above, the heating temperature upon the diffusion bonding is within the temperature range of 880° C. to 1080° C. The range is provided since sufficient bonding strength cannot be obtained in a case where the heating temperature is less than 880° C. and the bonding strength is not sufficient in a case where the heating temperature is over 1080° C., which leads to a risk of weld spatter caused by a current applied to a bonding target portion for the purpose of increasing the temperature to the target temperature.

Advantageous Effects of Invention

In the lithium-ion secondary-battery case of the present invention, the stainless steel foils are used as the materials, so that strength of the materials themselves is greater than a case which uses a conventional aluminum laminating material having aluminum as a base material, which therefore increases strength of the case against external force, thereby making it difficult to deform the battery itself.

Moreover, the electrode terminal is drawn out from the hole provided at the vertical wall part of the cup component, which no longer requires, for example, superposition of a resin film for providing heat sealing or an insulation function on a bonding region between the cup component and the cover component. Therefore, the bonding of the cup component storing the electrode and the separator to the cover component can be carried out only through diffusion bonding that does not cause weld spatter.

Further, there is a risk that small waving is formed at the flange part since the stainless steel foil having greater strength than aluminum or the like is used as the material, upon the formation of the cup component, but even when the small waving is formed at the flange part, the diffusion bonding is performed while pressurizing with the upper and lower electrodes, which permits performance of the bonding with high reliability.

Specifically, the present invention can provide a lithium-ion secondary-battery case that allows bonding without weld spatter and has strength against external force, and a method for manufacturing the lithium-ion secondary-battery case.

BEST MODE FOR CARRYING OUT THE INVENTION

Hereinafter, an embodiment of the present invention will be described in detail with reference to the drawings.

Embodiment

Figure 1:
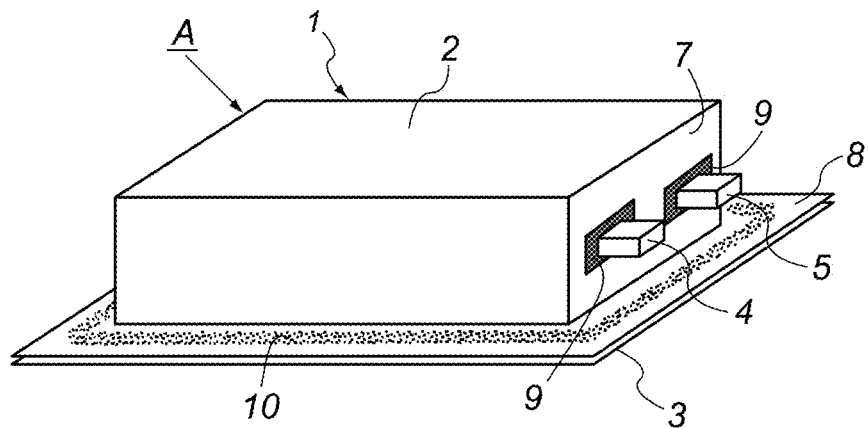
FIG. 1 is a schematic diagram of a lithium-ion secondary-battery case according to an embodiment of the present invention.
Figure 2:
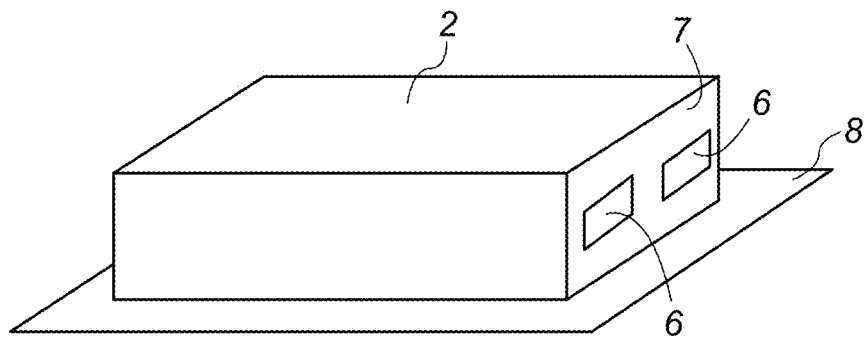
FIG. 2 is a schematic diagram of a case component according to the embodiment of the invention.

FIG. 1 is a schematic diagram of a lithium-ion secondary-battery case 1 according to an embodiment of the invention, and FIG. 2 illustrates a cup component 2 forming the lithium-ion secondary-battery case 1. The cup component 2 is obtained by drawing an austenitic stainless steel foil into a cup shape and further piercing holes 6 for drawing out electrode terminals 4 and 5. Performing diffusion bonding of the cup component 2 and a cover component 3 results in the lithium-ion secondary-battery case 1. In the embodiment illustrated, the aforementioned holes 6 are provided at a vertical wall part 7 of the cup component 2, details of which will be described later on.

The cup component 2 and the cover component 3 use stainless steel foils as materials thereof. For the stainless steel foil used for the cup component 2, that requires the deep drawing, an austenitic stainless steel foil is used.

On the other hand, for the stainless steel foil used for the cover component 3, a two-phase stainless steel foil is used for the purpose of performing the diffusion bonding with no weld spatter. Both the stainless steel foils normally have a sheet thickness of 0.1 mm or less, although not limited thereto.

The cup component 2 is obtained by deep drawing the stainless steel foil into a cup shape with a flange 8, and the holes 6 for drawing out the positive electrode terminal 4 and the negative electrode terminal 5 are formed in horizontal symmetry on one surface, on a short side, of the vertical wall part 7. Note that the holes 6 can be formed through, for example, punching. Moreover, the holes 6 each having a rectangular shape are illustrated in the cup component 2 of the embodiment illustrated, but the shape of the holes 6 is not limited to the rectangular shape and may be, for example, a circular shape.

Although not illustrated, a pair of electrodes serving as a negative electrode and a positive electrode are stored in the cup component 2 with a separator sandwiched therebetween, and the electrode terminals 4 and 5 connected to the respective electrodes are drawn out from the holes 6. Thus, the size of the holes 6 is more or less larger than the size of the electrode terminals 4 and 5, and an insulation component 9 is fitted in a gap between the electrode terminal 4, 5 and the corresponding hole 6 in order to achieve insulation between the cup component 2 and the electrode terminal 4, 5. Synthetic resin products of, for example, polypropylene, although not limited thereto, are preferably used as materials for the insulation components 9. Note that the insulation components 9 may be welded and firmly fixed, according to need, to improve the degree of sealing of the holes 6 through which the electrode terminals 4 and 5 are drawn out.

Figure 3:
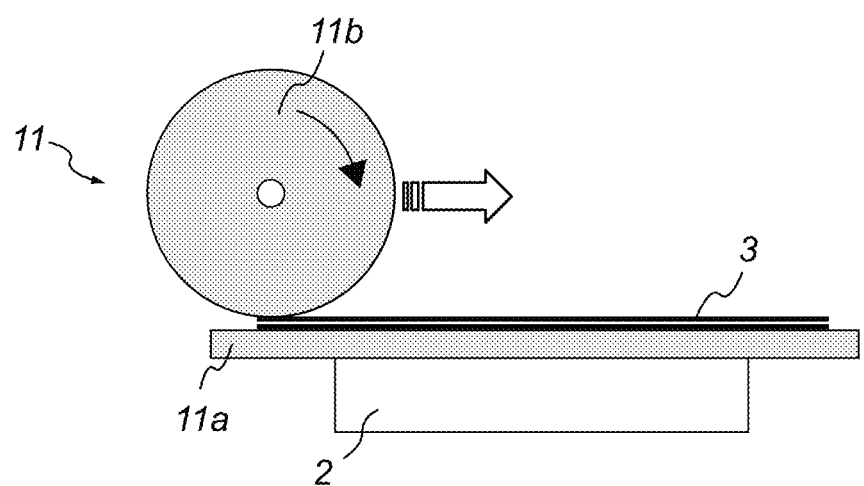
FIG. 3 is a schematic diagram of a device according to the embodiment of the invention.

Next, upon manufacture of a lithium-ion secondary battery A as illustrated in FIG. 1 by using the lithium-ion secondary-battery case 1, after the electrode terminals 4 and 5 are first drawn out from the holes 6 in a manner as described above, the cover component 3 of a thin plate-like shape having substantially the same size as the size of an outer edge of the flange 8 is superposed on an opening portion of the cup component 2 and diffusion bonding of the cup component 2 and the cover component 3 is performed at a portion of the flange 8 to achieve integral bonding. For the diffusion bonding in the aforementioned case, for example, a seam welder 11 as shown in FIG. 3 is used. For the purpose of avoiding hitting of the electrode terminals 4 and 5 by electrodes used upon the diffusion bonding, in the seam welder 11, a bar-like electrode 11a of, for example, a square shape in a cross section is used as the electrode arranged on the cup component 2 side, and an electrode wheel 11b of a disc-like shape is used as the electrode arranged on the cover component 3 side. Then the bar-like electrode 11a on the cup component 2 side is fixed and the electrode wheel 11b on the cover component 3 side is rotated to perform the bonding.

Then the insulation components 9 are melted and firmly fixated in a manner so as to fill the gaps between the electrode terminals 4 and 5 drawn out and the holes 6, an electrolytic solution is injected from an injection port, not illustrated, and the injection port is sealed to complete a lithium-ion secondary battery A.

EXAMPLES

Hereinafter, the present invention will be described in more detail, referring to examples, but the invention is not limited to the examples.

A SUS304 foil (with a sheet thickness of 0.1 mm) as an austenitic stainless steel was used as a raw material of the cup component 2. A two-phase stainless steel foil with a sheet thickness of 0.1 mm was used as a material of the cover component 3. Table 1 illustrates alloy components of the respective foils. Note that symbol "-" in Table 1 means "No analyzed value".

TABLE 1

|  | C | Si | Mn | Ni | Cr | Cu | Mo | Al | Ti | Nb | N | (% by mass) X value |
|---|---|---|---|---|---|---|---|---|---|---|---|---|
| SUS304 | 0.064 | 0.49 | 0.77 | 8.07 | 18.30 | 0.23 | 0.15 | — | — | — | 0.031 | −14 |
| Two-phase steel | 0.061 | 0.53 | 0.29 | 2.00 | 16.30 | 0.05 | 0.05 | 0.014 | 0.003 | — | 0.012 | 682 |

The cup component 2 was dimensioned in a manner such that the cup part has a width of 150 mm, a depth of 100 mm, and a height of 20 mm and the flange 8 has a width of 10 mm. The manufacture of the cup component 2 was performed through four processes including blank punching, drawing, hole punching, and flange trimming.

The electrodes with the separator sandwiched therebetween were stored into the cup component 2 manufactured through the processes described above, and the electrode terminals 4 and 5 were drawn out from the holes 6. Then the cup component 2 and the cover component 3 were superposed on each other, and the diffusion bonding using the seam welder 11 was performed to form a diffusion-bonded part 10.

As the electrodes for the diffusion bonding, the bar-like electrode 11a of an 8 mm-square shape in a cross section was provided as the electrode on the cup component 2 side, and the electrode wheel 11b of a disk-like shape having a diameter of 100 mm and a width of 5 mm was provided as the electrode on the cover component 3 side. Then as diffusion bonding conditions, the pressurizing force was 150 N, the welding speed was 1.0 m/min, and the welding currents were (A) 0.5 kA, (B) 1.0 kA, and (C) 2.0 kA for continuous energization. Under the aforementioned conditions, the temperatures of the bonding portion are assumed to be (A) 850° C., (B) 1050° C., and (C) 1250° C.

Then, films made of polypropylene as the insulation components 9 were filled in the gaps between the electrode terminals 4, 5 and the holes 6, and the films were heat-melted at 120° C. and the electrode terminals 4 and 5 were firmly fixed while insulated from the cup component 2 to thereby manufacture the case component. Finally, a 6-fluoro lithium phosphate-based electrolytic solution was injected from the injection hole, not illustrated, into the case component to manufacture the lithium-ion secondary battery A.

The manufactured lithium-ion secondary battery A was repeatedly charged and discharged for one month and the states of the battery, for example, leakage of the electrolytic solution, were evaluated. Results of the evaluation showed no leakage of the electrolytic solution from the diffusion-bonded part 10 and no short-circuit attributable to weld spatter.

Figure 4:
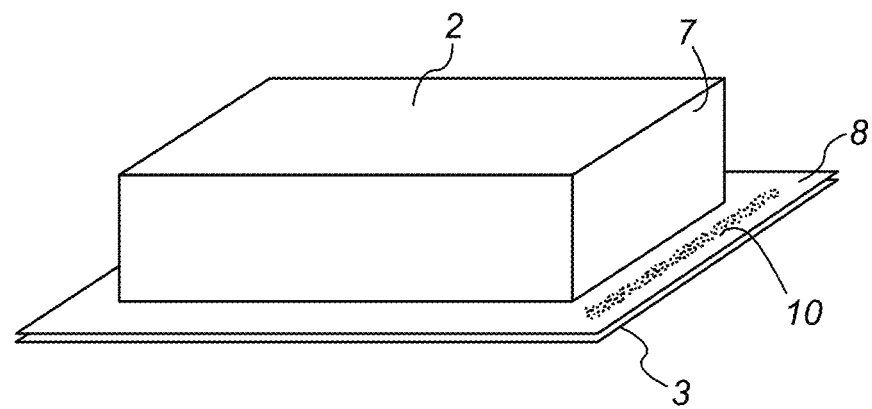
FIG. 4 is a schematic diagram illustrating the case component for which the spatter dispersion state has been checked.
Figure 5:
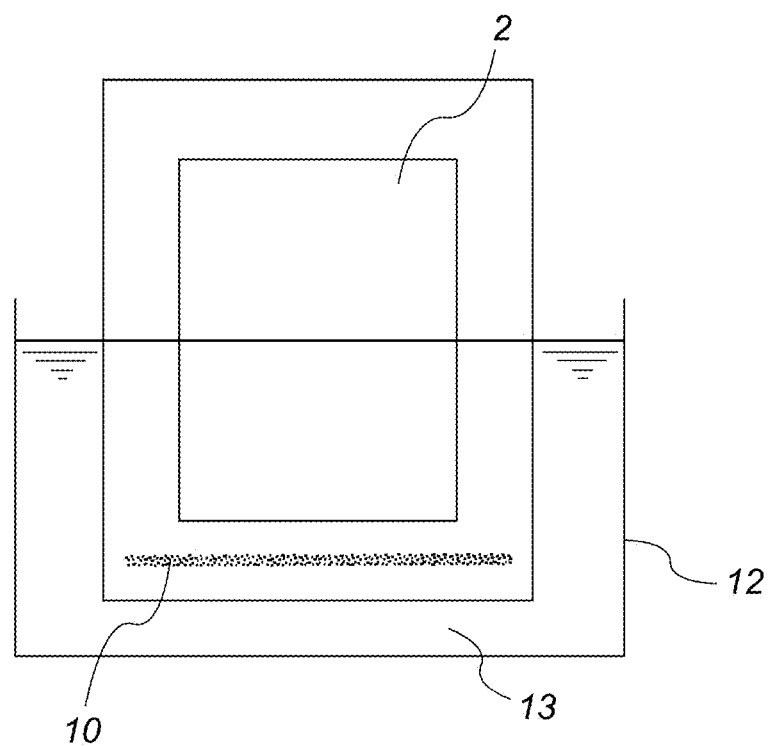
FIG. 5 is a schematic diagram of a method for checking the spatter dispersion state.

Next, a large number of case components each bonded to the cover component 3 at only one side of the flange 8, as illustrated in FIG. 4, were manufactured in the aforementioned three types of bonding conditions (A) to (C), and ten of the manufactured case components were taken out, and the spatter dispersion states thereof were checked. A method for checking the spatter dispersion states is as follows. First, 1000 mL of ultrapure water 13 (in which the number of particles having a particle size of 0.2 μm or more was equal to or less than one/mL) was poured into a washed container 12, and ultrasonic wave application was performed for five minutes with the diffusion-bonded part immersed in the ultrapure water (see FIG. 5). An ultrasonic cleaner (W-118 produced by HONDA ELECTRONICS CO. LTD and having a frequency of 45 kHz and an output of 600 W) was used for the ultrasonic wave application. Then the particles in the obtained extract were collected by a filter with a hole diameter of 0.1 μm and the spatter dispersion states were observed through SEM-EDX measurement.

As a result, no metal element was confirmed in the bonding conditions (A) and (B) while a metal element was confirmed in the bonding condition (C).

The cross section of the diffusion-bonded part was observed with a microscope and a metal structure on the cover component 3 side was checked, results of which showed that an interface at the bonded part was diffusion-bonded without a welded nugget in the bonding conditions (A) and (B) while the interface at the bonded part was melted and a welded nugget was formed in the bonding condition (C).

INDUSTRIAL APPLICABILITY

The lithium-ion secondary battery according to the present invention is preferably used as a polymer type lithium-ion secondary battery.

REFERENCE SIGNS LIST

A Lithium-ion secondary battery
1 Lithium-ion secondary-battery case
2 Cup component
3 Cover component
4 (Positive) electrode terminal
5 (Negative) electrode terminal
6 Hole
7 Vertical wall part
8 Flange
9 Insulation component
10 Diffusion-bonded part
11 Seam welder
11a Bar-like electrode
11b Electrode wheel
12 Container
13 Ultrapure water

The invention claimed is:

1. A method for manufacturing a lithium-ion secondary-battery case comprising:
   bringing a cup component and a cover component into direct contact with each other; and
   integrating the cup component and the cover component through diffusion bonding, the cup component being formed by deep drawing an austenitic stainless steel foil into a cup-like shape, having a flange formed at a peripheral edge of an opening part thereof, and having a hole for drawing out an electrode terminal formed at a vertical wall part, the cover component being formed of a two-phase stainless steel foil having an austenite transformation start temperature $A_{C1}$ in a temperature increase process at 650° C. to 950° C. and having an austenite and ferrite two-phase temperature range of 880° C. and higher, the cover component covering the opening part of the cup component,
   wherein
   the diffusion bonding is performed using a seam welder, a bar-like electrode of a square shape in a cross section is arranged on the cup component side and an electrode wheel of a disk-like shape is arranged on the cover component side, and the diffusion bonding is performed while accompanied by grain boundary movement upon transformation of the two-phase stainless steel foil from a ferrite phase into an austenite phase within a heating temperature range of 880° C. to 1080° C.

2. The method of claim 1, wherein the austenitic stainless steel foil and the two-phase stainless steel foil have a thickness of 0.1 mm or less.

* * * * *